United States Patent Office 3,503,748
Patented Mar. 31, 1970

3,503,748
LIGHT-SENSITIVE PHOTOGRAPHIC SILVER HALIDE LAYER FOR THE COLOR DEVELOPING PROCESS
Alfred Froehlich, Marly-le-Grand, Switzerland, assignor to Ciba Limited, Basel, Switzerland, a company of Switzerland
No Drawing. Continuation-in-part of application Ser. No. 301,626, Aug. 12, 1963. This application Dec. 12, 1967, Ser. No. 692,282
Claims priority, application Switzerland, Aug. 31, 1962, 10,399/62
Int. Cl. G03c 1/40
U.S. Cl. 96—100
6 Claims

ABSTRACT OF THE DISCLOSURE

The present invention relates to a light-sensitive photographic silver halide layer for the color developing process. This layer contains as a color-former for the yellow dyestuff a sulfonic acid of an acetylaminobenzene compound. The color-formers are diffusion-resistant, fast-coupling, soluble in water and yield processed coatings of complete transparency.

CROSS REFERENCE

This application is a continuation-in-part of applicant's copending application Ser. No. 301,626, filed Aug. 12, 1963, now abandoned, the disclosure of which is relied on and incorporated by reference in this application.

The present invention provides new acylacetylaminobenzene compounds corresponding to the formula (1) 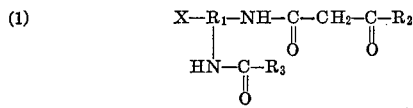

in which $R_1$ represents a benzene radical, $R_2$ represents a benzene radical or a cycloalkyl radical or an alkyl radical, $R_3$ represents an alkyl radical containing at least 3 carbon atoms, and X represents an alkoxy group containing at most 2 carbon atoms, the molecule containing at least one sulfonic acid group bonded to a benzene radical.

These sulfonic acids are obtained by treating acylacetylaminobenzene compounds of the Formula 1 which are free from sulfonic acid groups with sulfonating agents. The acylacetylaminobenzene compounds free from sulfonic acid groups used in this process as starting materials are advantageously obtained by reacting an amine of the formula (2) 

with an ester of the formula (3) 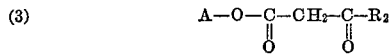

in which $R_1$, $R_2$, $R_3$ and X have the meanings given above, A represents a methyl or ethyl radical.

The compounds of the Formula 1 free from sulfonic acid groups so obtained can contain further substituents on the benzene radicals, for example, halogen atoms such as chlorine, ethyl or methyl groups, further ethoxy or preferably methoxy groups. The alkyl radical $R_2$ advantageously contains only one or two carbon atoms, where the alkyl radical $R_3$ advantageously contains 11 to 21 carbon atoms. As cycloalkyl radical $R_2$ there is primarily used a cyclohexyl radical. Moreover, preference is given to acetylaminobenzoyl compounds of the formula (4) 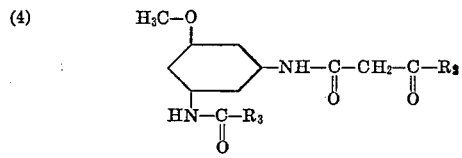

in which $R_2$ represents a benzene radical or a methyl group and $R_3$ represents an alkyl radical containing 11 to 21 carbon atoms.

The acylacetylaminobenzene compounds of the Formula 1 and 4 can be treated with sulfonating agents by methods in themselves known. A suitable sulfonating agent is, for example, concentrated sulfuric acid that contains a catalytic amount of boric acid, advantageously a small percent. Also suitable as sulfonating agent is a mixture comprising concentrated sulfuric acid, that may contain free sulfur trioxide, and chlorosulfonic acid. In general, the sulfonation is advantageously carried out at a low temperature, for example, at a temperature between 0° C. and about 20° C. After the reaction mixture has been discharged on to ice, the sulfonic acids formed can, as a rule, easily be separated from the reaction mixture and, if desired or required, they can subsequently be purified by recrystallization from a suitable solvent. The compound of Formula 4 presumably carries the sulfonic acid group in one of the o-positions to the methoxy group. The new acylacetylaminobenzene compounds containing sulfonic acid groups so obtained of the composition given above can be used, for example, as intermediate products for the manufacture of dyestuffs. They are specially suitable as color-couplers for yellow dyestuffs in light-sensitive photographic layers as they are diffusion-resistant, fast-coupling and readily soluble in water. Processed coating of the present couplers are, as a result of the favorable solubility characteristics of the couplers, completely transparent. Many of the yellow dyestuffs formed with these compounds in the color development process exhibit specially pure tints and specially favourable absorption properties.

The incorporation of the acylacetylaminobenzenes containing sulfonic acid groups in the light-sensitive layer and the production of the colored photographic images can be carried out in known manner. The compounds, if necessary, in the form of alkali salts, are water-soluble and can be added to the color developer or emulsion before casting.

The following examples illustrate the invention. Unless otherwise stated, the parts and percentages are by weight.

EXAMPLE 1

1-amino-2-stearoylamino - 5 - methoxybenzene is condensed in known manner with benzoylacetic acid ethyl ester. The condensation product so obtained of the formula (5) 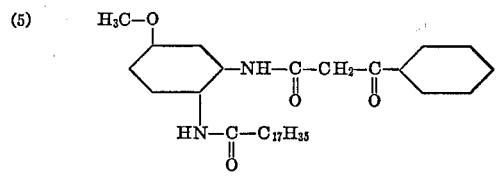

is introduced into a mixture of monohydrate and chlorosulfonic acid, while cooling with ice, in a ratio of 3:1. The sulfonation is complete when a test portion gives a clear solution in aqueous sodium carbonate solution. The reaction mixture is then discharged onto ice, the precipitate is filtered off, washed, dried and then recrystallized from glacial acetic acid. The sulfonic acid so obtained is suitable as a yellow coupler for the color development process.

Similar yellow couplers are obtained when lauroyl-amino - hexahydrobenzoylacetoamino - methoxybenzene of the formula (6) 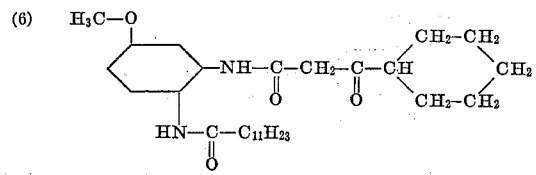

is sulfonated.

EXAMPLE 2

The condensation product obtained from paramethoxy-benzoylacetic acid ethyl ester and 1-amino-2-stearoyl-amino-5-methoxybenzene which corresponds to the formula (7) 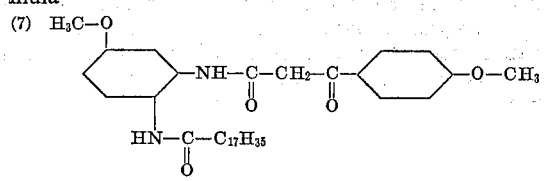

is slowly introduced into a mixture of monohydrate and chlorosulfonic acid, in a ratio of 1:3 while cooling to a low temperature with ice or a mixture of ice and sodium chloride. As soon as a test portion gives a clear solution in an aqueous sodium carbonate solution, the reaction mixture is poured on to ice and neutralized with calcium carbonate. The reaction mixture is filtered and the filtrate is evaporated to dryness in vacuo. The residue is taken up in a small amount of hot methanol, filtered, and allowed to cool. The sulfonation product that precipitates thereby is isolated by suction filtration and dried. It can be used as a yellow coupler.

EXAMPLE 3

20 parts of the condensation product of the Formula 5 are homogeneously mixed with 3 parts of anhydrous boric acid. The mixture is introduced into 70 parts of monohydrate at 10 to 12° C. while stirring. A further 70 parts of monohydrate are added dropwise after 1½ hours. Stirring is continued for a further 3 hours at 20° C., and the mixture is then cooled with ice for 15 hours. The precipitate formed by the addition of 250 parts of ice is separated off and the sulfonic acid is purified through the ammonium salt. It corresponds to the sulfonic acid obtained in the manner described in the first paragraph of Example 1.

EXAMPLE 4

548 parts of amino-4-ethoxybenzene are dissolved in 1630 parts of pyridine, and stearic acid is added dropwise, at the boil, until free amino compound is no longer detectable (about 1100 parts by volume). The hot reaction mixture is stirred into a mixture comprising
10,000 parts of water,
2000 parts by volume of hydrochloric acid of 30% strength, and
5000 parts of ice, the mixture is suction-filtered, the filter residue is washed, dried, and recrystallized from alcohol; it melts at about 100° C.
225 parts of the 1-stearoylamino-4-ethoxybenzene so obtained,
330 parts of water, and
93 parts of nitric acid of 62% strength are boiled for 45 minutes, while stirring. The mixture is then diluted with
10,000 parts of water, suction-filtered, and the filter residue is dried. The filter residue is recrystallized from alcohol and then from petrol in the presence of active carbon, melting point: 75 to 76° C.

500 parts of the 1-nitro-2-stearoylamino-5-ethoxybenzene so obtained are mixed with
5000 parts by volume of ethanol in an autoclave and reduced with Raney nickel at 100° C. and under a pressure of 3 atmospheres (gauge). Melting point 119 to 121° C.
200 parts of the compound thus reduced are dissolved in
266 parts by volume of hot xylene, and then
113 parts of benzoyl acetic acid ethyl ester are added dropwise, at the boil, while stirring, in the course of one hour, during which period
100 parts by volume of xylene are distilled off along with the liberated alcohol. Stirring is continued for 4 hours at 120° C., whereupon the reaction mixture is stirred into
1500 parts by volume of methanol, the mixture is cooled and then suction-filtered. The filter residue is recrystallized from methanol and then from acetone, after which the condensation product so obtained, which corresponds to the formula (8) 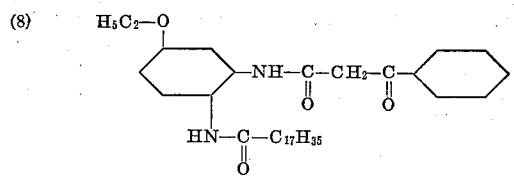

melts at 114 to 116° C.

50 parts of the product of the Formula 8 are introduced at a temperature of −5 to 0° C. into a mixture comprising
75 parts by volume of sulfuric acid monohydrate,
25 parts by volume of oleum of 26% strength and
30 parts by volume of chlorosulfonic acid. The mixture is stirred for a further 3 hours, during which period the temperature should rise to 0° C. The mixture is then discharged on to a mixture of
200 parts of water
200 parts of ice, and
100 parts of sodium chloride, whereupon it is suction-filtered and washed with a saturated sodium chloride solution until the filtrate reacts neutral. After drying, the filter residue is recrystallized from glacial acetic acid. There is obtained a monosulfonic acid of the compound of the Formula 8 that can be used as a yellow coupler for the color development process.

EXAMPLE 5

336 parts of 1-amino-2-methoxy-4-nitrobenzene are dissolved in
1000 parts by volume of pyridine. Stearic acid chloride is added dropwise, at boiling temperature, until free amine is no longer detectable (about 660 parts by volume). The reaction mixture is poured into a mixture of
10,000 parts of water, and
20,000 parts by volume of hydrochloric acid of 30% strength, the mixture is suction-filtered, and the filter residue is washed with water until the filtrate runs neutral. After drying, the filter residue is recrystallized from ethanol; melting point 91 to 94° C.
500 parts of the stearoylamino compound so obtained are dissolved in
500 parts by volume of ethanol in an autoclave and reduced with Raney nickel at 100° C. under a pressure of 3 atmospheres (gauge). The melting point after being recrystallized twice from alcohol is 106 to 109° C.
200 parts of the reduction production are dissolved in
266 parts by volume of xylene.
108 parts of benzoylacetic acid ethyl ester are added dropwise at boiling temperature in the course of 1 hour in such a manner that 100 parts of volume by xylene are distilled off simultaneously. Stirring is continued for 4 hours at 120° C., whereupon the mixture is discharged onto 1500 parts by volume of methanol. After recrystallization from methanol and acetone and washing with ether there is obtained a condensation product of the formula (9) 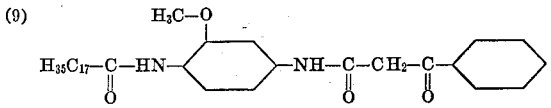

melting at 117 to 119° C.

50 parts of the product of the Formula 9 are introduced, at −5 to 0° C. into a mixture comprising
  75 parts by volume of monohydrate
  25 parts by volume of oleum of 26% strength and
  30 parts by volume of chlorosulfonic acid, and the mixture is stirred for 3 hours, during which period the temperature rises to 0° C. The mixture is introduced into a mixture comprising
  200 parts of water,
  200 parts of ice, and
  100 parts of sodium chloride, the resulting mixture is suction-filtered, and the filter residue is washed with saturated sodium chloride solution until the filtrate reacts neutral. After drying, the filtrate is recrystallized from glacial acetic acid. There is obtained a sulfonic acid of the compound of the Formula 9. The sulfonic acid is suitable as a yellow coupler for the color development process.

EXAMPLE 6

1-amino-2-steroylamino-5-methoxybenzene is condensed in known manner with para-methylbenzoylacetic ethyl ester.

(10) 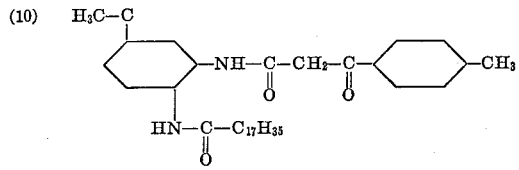

are introduced at a temperature below 0° C. into a mixture comprising
  75 parts by volume of monohydrate
  25 parts by volume of oleum of 26% strength and
  30 parts by volume of chlorosulfonic acid. The mixture is stirred for 3 hours during which period the temperature rises to 0° C. The mixture is then discharged on to a mixture comprising
  200 parts of water
  400 parts of ice, and
  150 parts of sodium chloride. This mixture is then suction-filtered and the filter residue is washed with a saturated sodium chloride solution until the filtrate reacts neutral. After drying, the filter residue is recrystallized from glacial acetic acid. A monosulfonic acid of the Formula 10 is obtained. This sulfonic acid can be used as yellow coupler for the color development process.

EXAMPLE 7

336 parts of 1-methoxy-3-nitro-4-aminobenzene are dissolved in
  1000 parts by volume of pyridine, and lauroylchloride is added dropwise, at boiling temperature, until free amine is no longer detectable (about 438 parts). The reaction mixture is poured into
  10,000 parts of water and
  2000 parts by volume of hydrochloric acid of 30% strength, the mixture is suction-filtered and the filter residue is washed with water until the filtrate reacts neutral. After drying, the filter residue is recrystallized from methanol and then from petrol; melting point 69° C.

500 parts of the 1-nitro-2-lauroylamino-5-methoxybenzene so obtained are dissolved in
  5000 parts by volume of alcohol in an autoclave and reduced with Raney nickel at 100° C. under a pressure of 3 atmospheres (gauge). The melting point after recrystallizing twice from methanol is 106 to 108° C.

160 parts of 1-amino-2-lauroylamino-5-methoxybenzene are dissolved in
  400 parts by volume of xylene, and
  110 parts of benzoyl acetic acid methyl ester are added dropwise at boiling temperature in such a manner that 150 cc. of a xylene/methanol mixture are distilled off in the course of 20 minutes.

The reaction mixture is poured into
  2000 parts by volume of methanol and allowed to crystallize. The condensation product of the formula

(11) 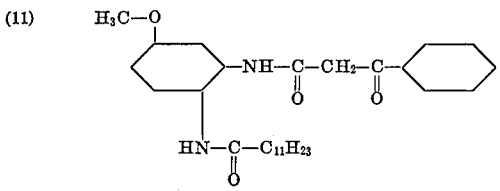

melts at 124° C.

50 parts of the porduct of the Formula 11 are introduced at −5 to 0° C. into a mixture comprising
  75 parts by volume of monohydrate
  25 parts by volume of oleum of 26% strength and
  30 parts by volume of chlorosulfonic acid, and the mixture is stirred for 3 hours, during which period the temperature rises to 0° C. The mixture is then discharged on to a mixture of
  200 parts of water
  200 parts of ice, and
  100 parts of sodium chloride. This mixture is then suction-filtered and the filter residue is washed with a saturated sodium chloride solution until the filtrate reacts neutral. After drying, the filter residue is recrystallized from glacial acetic acid. A monosulfonic acid of 1-benzylacetylamino-2-lauroylamino - 5 - methoxybenzene is obtained which is suitable as a yellow coupler for the color developing process.

EXAMPLE 8

50 parts of 1 - stearoylamino - 2 - acetoacetylamino-5-methoxybenzene of the formula

(12) 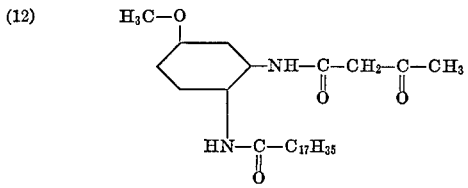

are introduced at −5 to 0° C. into a mixture comprising
  75 parts by volume of monohydrate
  25 parts by volume of oleum of 26% strength and
  30 parts by volume of chlorosulfonic acid. The mixture is stirred for 3 hours, during which period the temperature rises to 0° C. The mixture is then discharged into a mixture comprising
  200 parts of water
  200 parts of ice, and
  100 parts of sodium chloride, this mixture is then suction-filtered and the filter residue is washed with a saturated sodium chloride solution until the filtrate runs neutral. After drying, the filter residue is recrystallized. The resulting sulfonic acid can be used as a yellow coupler in the colour developing process.

EXAMPLE 9

15 grams of one of the sulfonic acids obtained in the manner described in any one of the Examples 1 to 8 are dissolved in 15 cc. of water, the pH value is adjusted to 8, and the solution is added to 1 kg. of a silver chloride emulsion. The emulsion is cast on to a layer support in the conventional manner and dried. When a master image is copied on this layer and the layer is developed with a para-aminodimethylaniline developer, a yellow image is obtained after the usual bleaching and fixation processes.

EXAMPLE 10

An exposed silver halide layer on a support is developed in a developer having the following composition:

Sulfate of 1-amino-4-diethylaminobenzene—3 grams.
Anhydrous sodium carbonate—75 grams.
Anhydrous sodium sulfite—1 gram.
Sodium bromide—1 gram.
1-benzoylacetylamino-2-butyroylamino-5-methoxybenzene sulfonic acid, prepared in a manner analogous to that described in Example 1—5 grams.
Bulked with water to—1000 cc.

After development, the layer is washed with water, bleached and fixed in the usual manner. A yellow image is obtained.

What is claimed is:

1. A light-sensitive photographic silver halide layer for the color developing process that contains as a color-former for the yellow dyestuff a sulfonic acid of an acylacetylamino compound of the formula

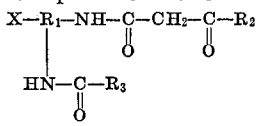

in which $R_1$ represents a sulfonic acid group containing benzene radical, $R_2$ represents a member selected from the group consisting of a benzene radical, a cycloalkyl radical and an alkyl radical, $R_3$ represents an alkyl radical containing at least 3 carbon atoms and X represents an alkoxy group containing at most 2 carbon atoms.

2. A light-sensitive photographic silver halide layer according to claim 1 for the color developing process that contains as a color-former for the yellow dyestuff a sulfonic acid of an acylacetylamino compound of the formula

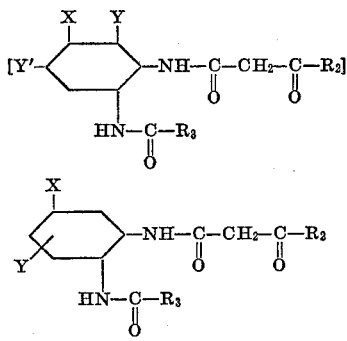

in which $R_2$ represents a benzene radical, $R_3$ represents an alkyl radical containing 11 to 21 carbon atoms, X represents an alkoxy group containing at most 2 carbon atoms and Y is a sulfonic acid group.

3. A light-sensitive photographic silver halide layer according to claim 1 for the color developing process that contains as a color-former for the yellow dyestuff a sulfonic acid of an acylacetylamino compound of the formula

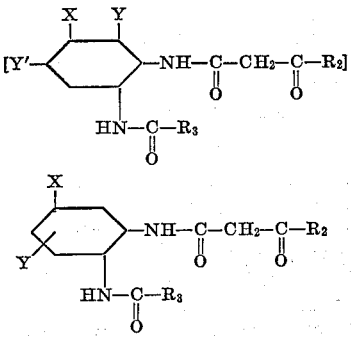

in which $R_2$ represents an alkyl radical containing at most 2 carbon atoms, $R_3$ represents an alkyl radical containing 11 to 21 carbon atoms, X represents an alkoxy group containing at most 2 carbon atoms and Y is a sulfonic acid group.

4. A light-sensitive photographic silver halide layer according to claim 1 for the color developing process that contains as a color-former for the yellow dyestuff a sulfonic acid of an acylacetylamino compound of the formula

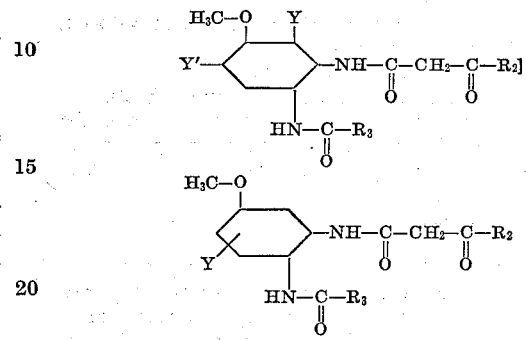

in which $R_2$ represents a benzene radical, $R_3$ represents an alkyl radical containing 11 to 21 carbon atoms and Y is a sulfonic acid group.

5. A light-sensitive photographic silver halide layer according to claim 1 for the color developing process that contains as a color-former for the yellow dyestuff a sulfonic acid of the acylacetylamino compound of the formula

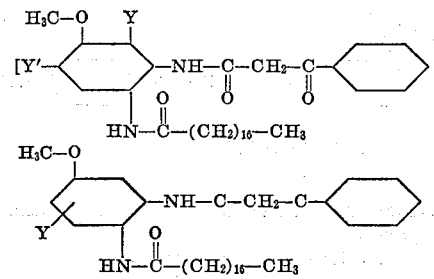

wherein Y is a sulfonic acid group.

6. A light-sensitive photographic silver halide layer according to claim 1 for the color developing process that contains as a color-former for the yellow dyestuff a sulfonic acid of the acylacetylamino compound of the formula

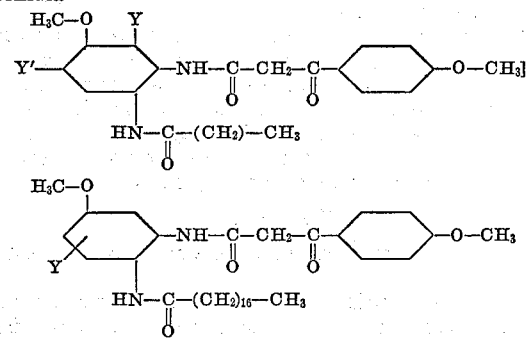

wherein Y is a sulfonic acid group.

References Cited

UNITED STATES PATENTS

| | | | |
|---|---|---|---|
| 2,407,210 | 9/1946 | Weissberger et al. | 96—100 |
| 2,704,709 | 3/1955 | Sprung | 96—100 |
| 2,868,829 | 1/1959 | Ayres et al. | 96—100 |
| 2,875,057 | 2/1959 | McCrossen et al. | 96—100 |
| 2,895,825 | 7/1959 | Pelz et al. | 96—56.6 |

FOREIGN PATENTS 808,276   2/1959   Great Britain.

J. TRAVIS BROWN, Primary Examiner

CASE TEL-2/E/CIP

UNITED STATES PATENT OFFICE
CERTIFICATE OF CORRECTION

Patent No. 3,503,748      Dated March 31, 1970

Inventor(s) ALFRED FROEHLICH

It is certified that error appears in the above-identified patent and that said Letters Patent are hereby corrected as shown below:

Column 7, line 26, after "acid" and after "group" insert —.

Column 7, in claims 2 and 3, delete the first formula of each.

Column 8, in claims 4, 5 and 6, delete the first formula of each.

SIGNED AND SEALED
MAR 2 1971

(SEAL)
Attest:

Edward M. Fletcher, Jr.
Attesting Officer

WILLIAM E. SCHUYLER, JR.
Commissioner of Patents